(12) United States Patent
Pinheiro et al.

(10) Patent No.: US 7,516,346 B2
(45) Date of Patent: Apr. 7, 2009

(54) SYSTEM AND METHOD FOR DYNAMICALLY CHANGING THE POWER MODE OF STORAGE DISKS BASED ON REDUNDANCY AND SYSTEM LOAD

(75) Inventors: Eduardo Pinheiro, Piscataway, NJ (US);
Ricardo Bianchini, Plainsboro, NJ (US);
Cezary Dubnicki, Monmouth Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 234 days.

(21) Appl. No.: 11/163,607

(22) Filed: Oct. 25, 2005

(65) Prior Publication Data

US 2006/0107099 A1 May 18, 2006

Related U.S. Application Data

(60) Provisional application No. 60/522,693, filed on Oct. 28, 2004.

(51) Int. Cl.
*G06F 1/00* (2006.01)
(52) U.S. Cl. ............ 713/324; 713/300; 713/320; 711/100; 711/114
(58) Field of Classification Search ............ 713/300, 713/320, 324
See application file for complete search history.

(56) References Cited

U.S. PATENT DOCUMENTS

| | | | | |
|---|---|---|---|---|
| 6,961,815 B2 * | 11/2005 | Kistler et al. | ............ | 711/114 |
| 7,007,141 B2 * | 2/2006 | Li et al. | ............ | 711/162 |
| 7,035,972 B2 * | 4/2006 | Guha et al. | ............ | 711/114 |
| 7,076,607 B2 * | 7/2006 | Miwa et al. | ............ | 711/114 |
| 7,210,005 B2 * | 4/2007 | Guha et al. | ............ | 711/114 |
| 7,234,074 B2 * | 6/2007 | Cohn et al. | ............ | 714/6 |
| 7,272,735 B2 * | 9/2007 | Fung | ............ | 713/320 |
| 2002/0062454 A1 * | 5/2002 | Fung | ............ | 713/300 |
| 2002/0144057 A1 * | 10/2002 | Li et al. | ............ | 711/112 |
| 2002/0199129 A1 * | 12/2002 | Bohrer et al. | ............ | 714/7 |
| 2003/0005354 A1 * | 1/2003 | Kalman | ............ | 714/7 |
| 2003/0145166 A1 * | 7/2003 | Miwa et al. | ............ | 711/114 |
| 2003/0149840 A1 * | 8/2003 | Bolt et al. | ............ | 711/114 |
| 2003/0200473 A1 * | 10/2003 | Fung | ............ | 713/320 |
| 2004/0054939 A1 * | 3/2004 | Guha et al. | ............ | 713/300 |
| 2004/0205387 A1 * | 10/2004 | Kleiman et al. | ............ | 714/6 |
| 2005/0132212 A1 * | 6/2005 | Haswell | ............ | 713/193 |
| 2005/0144486 A1 * | 6/2005 | Komarla et al. | ............ | 713/300 |
| 2005/0204097 A1 * | 9/2005 | Kistler et al. | ............ | 711/114 |
| 2005/0268121 A1 * | 12/2005 | Rothman et al. | ............ | 713/300 |

OTHER PUBLICATIONS

Alvarez, G.A. et al., "MINERVA: An Automated Resource Provisioning Tool for Large-Scale Storage Systems", ACM Transactions on Computer Systems, vol. 19, No. 4, pp. 483-518, Nov. 2001.

(Continued)

*Primary Examiner*—Thomas Lee
*Assistant Examiner*—Jaweed A Abbaszadeh
(74) *Attorney, Agent, or Firm*—Jeffrey Mark Weinick

(57) ABSTRACT

A system and method for reducing energy consumption in an information storage system is disclosed which takes advantage of the redundancy in a typical storage system.

12 Claims, 3 Drawing Sheets

OTHER PUBLICATIONS

Anderson, E. et al., "Ergastulum: quickly finding near-optimal storage system designs", Technical Report HPL-SSP-2001-05, HP Laboratories, Jun. 2002.

Anderson, E. et al., "Hippodrome: running circles around storage administration", Proceedings of the FAST 2002 Conference on File and Storage Technologies, pp. 175-188, Jan. 2002.

Carrera, E.V. et al., "Conserving Disk Energy in Network Servers", Proceedings of the 17th International Conference on Supercomputing, pp. 86-97, Jun. 2003.

Chase, J.S. et al., "Managing Energy and Server Resources in Hosting Centers", Proceedings of the 18th Symposium on Operating Systems Principles, pp. 103-116, Oct. 2001.

Colarelli, D. et al., "Massive Arrays of Idle Disks for Storage Archives", Proceedings of the 15th High Performance Networking and computing Conference, Nov. 2002.

Douglis, F. et al., "Adaptive Disk Spin-down Policies for Mobile Computers", Computing Systems, 8(4): 381-413, Apr. 1995.

Gurumurthi, S. et al., "DRPM: Dynamic Speed Control for Power Management in Server Class Disks", Proceedings oft he 30th Annual International Symposium on Computer Architecture, Jun. 2003.

Gurumurthi, S. et al., "Interplay of Energy and Performance for Disk Arrays Running Transaction Processing Workloads", Proceedings of the International Symposium on Performance Analysis of Systems and Software, Mar. 2003.

Heath, T. et al., "Self-Configuring Heterogeneous Server Clusters", Proceedings of the Workshop on Compilers and Operating Systems for Low Power, Sep. 2003.

Helmbold, D.P. et al., "Adaptive disk spin-down for mobile computers", Mobile Networks and Applications 5, pp. 285-297, 2000.

Pinheiro, E. et al., "Energy Conservation Techniques for Disk Array-Based Servers", Proceedings of the 18th International Conference on Supercomputing (ICS'04), pp. 68-78, Jun. 2004.

Rowstron, A. et al., "Storage management and caching in PAST, a large-scale persistent peer-to-peer storage utility", Symposium on Operating Systems Principles, pp. 188-201, 2001.

Zhu, Q. et al., "Reducing Energy Consumption of Disk Storage Using Power-Aware Cache Management", Proceedings of the 10th International Symposium on High-Performance Computer Architecture, Feb. 2004.

Zhu, Q. et al., "PB-LRU: A Self-Tuning Power Aware Storage Cache Replacement Algorithm for Conserving Disk Energy", Proceedings of the 18th International Conference on Supercomputing (ICS'04), pp. 79-88, Jun. 2004.

* cited by examiner

SYSTEM AND METHOD FOR DYNAMICALLY CHANGING THE POWER MODE OF STORAGE DISKS BASED ON REDUNDANCY AND SYSTEM LOAD

BACKGROUND OF THE INVENTION

The present invention relates to techniques for reducing energy consumption in information storage systems.

Energy consumption can be a significant fraction of the total cost of ownership of the IT infrastructure of a data center. A variety of techniques have emerged for conserving energy, in particular, in the context of the behavior of disks in a storage system. The simplest energy-saving technique is to transition disks to a low power mode after a fixed amount of time has elapsed since the last access. Alternatively, this threshold time-out period can be changed dynamically based on the past behavior of the accesses. The inventors generally refer to such techniques as "threshold-based." Other known techniques rely on the copying or migration of data, which the inventors refer to generally as "data-placing" techniques. For example, extra cache disks can be used to cache recently-accessed data while the original disks can remain mostly idle and, thus, in low-power mode. See D. Colarelli and D. Grunwald, "Massive Arrays of Idle Disks for Storage Archives," Proceedings of 18th Symposium on Operating Systems Principles (October 2001). Popular data and unpopular data can be rearranged and placed in separate sets of disks in such a way that utilization in the unpopular set is reduced. With reduced utilization, the disks can be transitioned to low-power modes. See E. Pinheiro and R. Bianchini, "Energy Conservation Techniques for Disk Array-Based Servers," Proceedings of 18th International Conference on Supercomputing (June 2004). A variety of other techniques have also been developed, including adjusting the speeds of multi-speed disks according to the load imposed on the disk—or using advanced storage cache replacement algorithms to selectively keep blocks of data in main memory so that disks can stay in low power mode for longer periods of time. See E. V. Carrera, E. Pinheiro, and R. Bianchini, "Conserving Disk Energy in Network Servers," Proceedings of 17th International Conference on Supercomputing (June 2003); S. Gurumurthi, A. Sivasubramaniam, M. Kandemir, and H. Franke, "DRPM: Dynamic Speed Control for Power Management in Server Class Disks," Proceedings of International Symposium on Computer Architecture (June 2003); Q. Zhu, A. Shankar, and Y. Zhou, "PB-LRU: A Self-Tuning Power Aware Storage Cache Replacement Algorithm for Conserving Disk Energy," Proceedings of 18th International Conference on Supercomputing (June 2004).

SUMMARY OF THE INVENTION

An information storage system and method are disclosed which reduce energy consumption in the information storage system by leveraging the redundancy present in the system. During regular operation, the inventors have observed that a typical storage system does not need to keep redundant data readily available. Accordingly, it is advantageous to divert access to appropriate subsets of the storage disks and allocate the disks in a manner so that the remaining disks can be transitioned to a low-power mode. The storage system need only maintain sufficient storage disks in a high-power mode to reconstruct any needed data. For example, in a storage system that distinguishes original data from redundant data, read requests can be diverted to disks storing original data and such disks kept in a high-power mode while write requests can be diverted so that redundant data is stored separately from the original data. The writes of redundant data can be buffered so that they need be propagated to such disks only periodically. The more redundancy the system has, the more potential energy savings can be achieved. The system advantageously can adapt to load levels, so that when the load is very high, additional storage disks can be transitioned to a high-power mode to help service the imposed load.

Unlike prior art energy conservation techniques which have typically been oblivious to redundancy, the present invention leverages redundancy in a manner that can potentially provide significant energy savings. These and other advantages of the invention will be apparent to those of ordinary skill in the art by reference to the following detailed description and the accompanying drawings.

DETAILED DESCRIPTION

Figure 1:
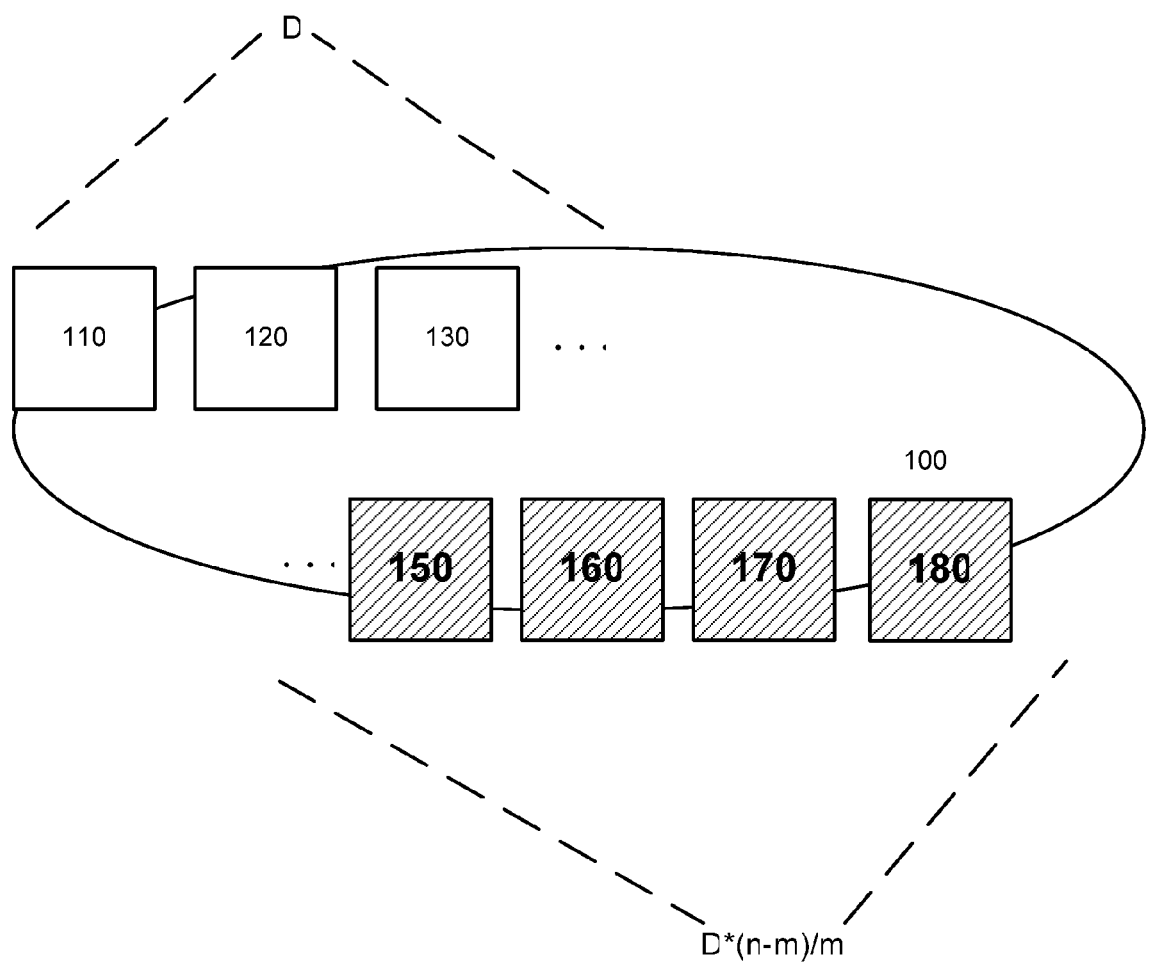
FIG. 1 is an abstract diagram of a redundant storage system used to illustrate an embodiment of the invention.

FIG. 1 is a diagram of an information storage system 100 comprising a plurality of storage disks 110, 120, 130, . . . , 150, 160, 170, 180, . . . . Each storage disk is assumed to have the capability to transition from a normal operating mode, referred to herein as a "high-power" mode, to at least one "low-power" mode.

The notion of a "disk" herein is meant to generically describe an information storage resource, such as storage disk drives or servers hosting storage disks or any other type of storage device. For purposes of discussion only, each device shall be referred to herein as a "disk" and it is assumed, for illustration purposes, that the power conservation mode refers to the operation of the device component. Nevertheless, the present invention is not so limited. The present invention can be readily extended to other components of a typical information storage system, including the memory, the processor, or an entire server itself. Such components can also be transitioned to a power conservation mode, thereby resulting in additional power savings. Also, the present invention is not limited to only two power modes, although it should be noted that most conventional high-performance server-class disks—such as SCSI drives—do not offer more than one power-saving mode. It should also be noted that the "low-power" mode may include a transition which switches the device completely off.

It is assumed that the storage disks in the system 100 in FIG. 1 are redundant. Redundancy, as the term is used herein, can be defined as the fraction of the total amount of storage space used divided by the minimum storage space required. That is, consider a system A that needs one disk drive's worth of storage space. Now consider a system B using two disks to store the original data from A plus a mirror of the data. It is said that system B is twice as redundant as A. Current popular methods of adding redundancy into storage systems include mirroring/replication, parity schemes, forward error-correcting codes (FECC), and erasure codes. These methods can be defined in terms of their redundancy configurations by (n, m) tuples, where each block of data is fragmented—e.g. striped, replicated, or encoded—into n fragments in such a way that only $m<=n$ of these fragments are needed to reconstruct the original information. For instance, a storage system comprised of a RAID-1 (mirroring) subsystem with two disks has (n=2, m=1), since there are two copies of each piece of data but only one needs to be read to reconstruct the original information. Representing parity-based systems is not as simple, since (n,m) depends on whether all disks are active. For example, N-disk RAIDs 4 and 5 can be described by (n=N, m=N−1) when one disk is down, and by (n=2, m=1) when all disks are active.

Per the above definition of redundancy, the redundancy is given by the ratio n/m. Accordingly, the storage system 100 in FIG. 1 is assumed to need D disks in order to store data non-redundantly. The system 100 has a redundancy factor (n, m), the number of disks, N, being defined to be a function N(n, m). That is, with more redundancy, more storage space is needed. Hence, N(n,m)=(n/m). D where D is the minimum number of disks when n=m=1 (no redundancy) and n/m is the storage overhead. For simplicity, N is utilized herein instead of N(n,m) when it is obvious which n and m are used.

An advantageous approach to reducing the energy consumption in storage system 100 is to leverage the redundancy present in the system. It is observed that during regular execution (no failures), a storage system does not need to keep redundant data readily available. Unless failures occur or there is high demand, disks can be kept in low-power mode most of the time. Consider, for example, an archival system comprised of hundreds or thousands of disks. While there might be times when this system has to handle large volumes of writes, for the most part, it will be mostly used for reading operations. Most requests are reads; update and additions are done much less frequently. Thus, most of the time the redundant information is not needed and the components used to keep this data can be kept in low-power mode. In accordance with an aspect of the invention, it is advantageous to divert access to an appropriate subset of disks so as to take advantage of the redundancy in the system. The inventors refer to the technique as "diverted accesses." Reads are diverted to storage disks kept in high-power mode. Similarly, writes can be diverted so as to ensure that sufficient data is maintained at the disks kept in high-power mode to reconstruct the updated data. This way, the more redundancy the system has, the more energy it will save. When the load is very high, additional disks can be brought online (in high-power mode) to help service the imposed load.

The notion of diverted access relies on the fact that under low load and during normal operation of the system 100 in FIG. 1, i.e. when no failures happen, there is no need to maintain all the redundant data readily available. In accordance with an embodiment of the invention, D disks, depicted as disks 110, 120, 130, . . . in FIG. 1, are allocated in a manner to handle all of the read operations during normal operation. It is assumed that the disks 110, 120, 130, . . . contain sufficient data to reconstruct all of the data needed for read operations. The system 100 can then switch all of the other D·(n−m)/m disks to low-power mode and, thus, save energy. These disks are depicted as 150, 160, 170, 180, . . . in FIG. 1. When the load is high, the other replicas can be powered up to assist with more bandwidth.

Figure 2:
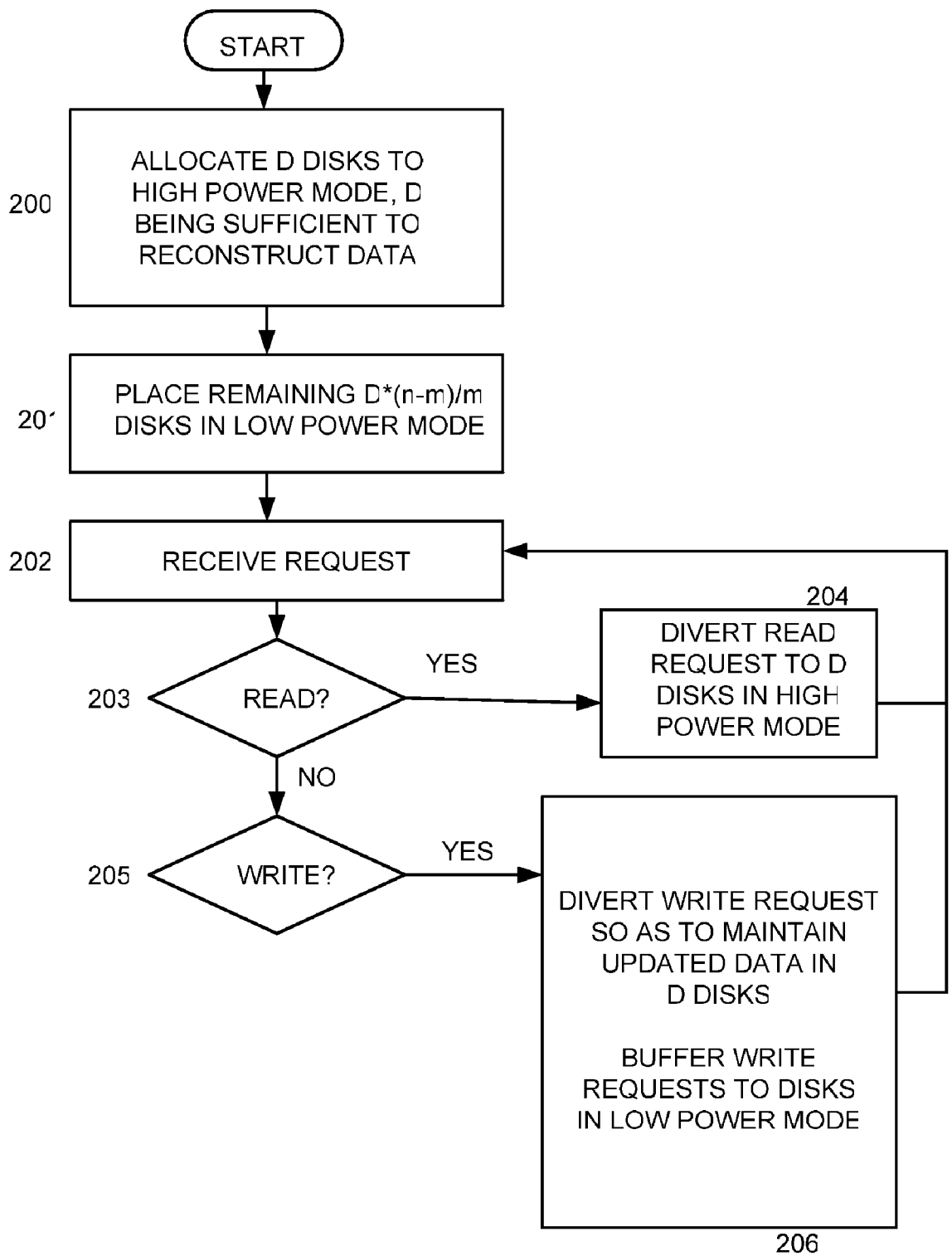
FIG. 2 is a flowchart of processing performed in a redundant storage system, in accordance with an embodiment of the invention.

FIG. 2 is a flowchart of processing performed in the storage system in accordance with an embodiment of the invention. At step 200, the disks are allocated so that sufficient disks are maintained in high-power mode to reconstruct data needed for normal read operations. At step 201, the remaining disks are transitioned to a low-power mode. At step 202, a request is received. If the request is a read request, at step 203, then the request is diverted to one of the disks maintained in high-power mode and not to the disks that were transitioned to a low-power mode. If on the other hand, the request is a write request, at step 205, then the write request would be handled in accordance with the particular redundancy scheme being utilized, except that the data is diverted so as to ensure that the disks in high-power mode receive the updates and/or additions. The remaining disks in low-power mode can be powered up temporarily to receive the updated or added data. The writes of this data can be propagated to these disks when the load is high—or only periodically, when the load is light or moderate. It should be noted that updating this data on all writes would promote reliability but would prevent energy conservation for workloads with a non-trivial fraction of write accesses. It can be advantageous to buffer writes to the disks in low-power mode long enough to prevent frequent power-mode transitions. Buffering these writes for long periods would promote energy conservation but possibly harm reliability as to the data written during these periods. For systems that cannot accept even a short window of lower reliability for a fraction of their data, the writes can be buffered in non-volatile memory in single-node storage systems or multiple memories in distributed storage systems.

Figure 3:
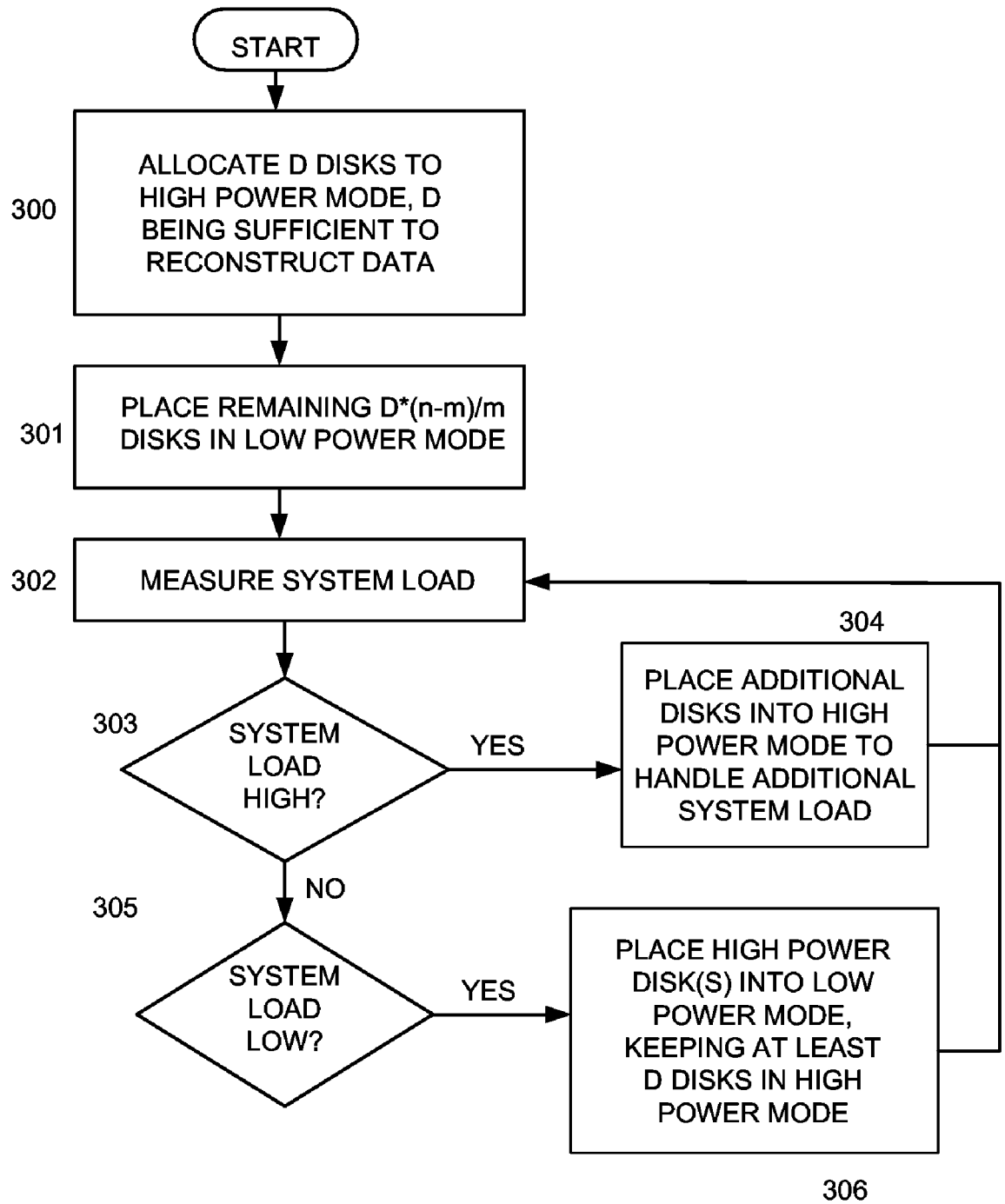
FIG. 3 is a flowchart of processing performed in a redundant storage system, in accordance with another embodiment of another aspect of the invention.

FIG. 3 shows how the processing performed by the storage system can be modified to adapt to the system load. At step 300, the disks are allocated so that sufficient disks are maintained in high-power mode to reconstruct data needed for normal read operations. At step 301, the remaining disks are transitioned to a low-power mode. At step 302, a measurement of system load is conducted. If the system load is deemed to be "high" at step 303, for example if it exceeds some threshold pre-determined by the system administrator, then additional disks can be transitioned to high-power mode in order to handle the additional system load, at step 304. The system can intelligently select a redundant disk to add to the active disks based on the characteristics of the load being imposed on the system. If the high system load subsides at some point, at step 305, then, at step 306, one or more of the disks in high-power mode can be transitioned back to low-power mode, while maintaining at least a sufficient number of disks to reconstruct all data needed for normal read operations. Thus, the number of disks allocated to a high-power mode in the system advantageously adapts to the load being imposed on the system.

The amount of energy conserved by diverting accesses can be estimated as follows. Each disk has a power consumption of $P_h$ Watts when powered on and ready to service requests (high-power mode) and $P_l$ when in standby mode, not able to service requests (low power mode). The power mode transitions, spin up and spin down, are assumed to take time $T_u$ and $T_d$, respectively. The transition energies are measured as the extra energy over the disk's baseline energy in each state. More specifically, $E_u$ is the extra energy spent during a spin up over $P_h \cdot T_u$ and $E_d$ is the extra energy spent during a spin down transition over $P_l \cdot T_d$. A full transition from high-power mode to low-power mode and back to high consumes $E_t = E_u + E_d$. Each access to the storage system is assumed to have a size blockSize. Internally, data is transferred in fragments of size fragSize, which is defined as blockSize/m. On each access, the disks take time S to seek to the appropriate track and time R to rotate to the desired sector. A block of data is transferred at a nominal rate B. It is not necessary to model the energy consumed by disk accesses, since it has been demonstrated that it is a small fraction of the overall disk energy, even in busy systems. It is assumed that the storage system request inter-arrival times are drawn from a distribution, e.g., a Pareto distribution, with an average 1/request_rate. Requests can be reads or writes with probabilities $1-p_w$ and $p_w$, respectively.

To estimate energy, a request inter-arrival time t can be drawn from the specified distribution, and a calculation made of the average idle time per disk, based on the inter-arrival time. The idle time on the original disks, $I_D$, can be computed by $I_D=D/m$. Note that all (read and write) request translate into accesses to the D disks. Writes can also be buffered, with a write buffer of size wbSize. So, the expected idle time on the redundant disks ($I_R$) is the expected time for the write buffer to fill up times R:

$$I_R = \frac{Rt * wbSize}{fragSize * n * p_w}$$

With these idle times, the energy for the diverted access technique can be computed as the sum of energies consumed by the original and redundant disks. These energies can be computed as follows. It is assumed that the disks are automatically transitioned to low-power mode after an idleness threshold T For the original disks, the energy is:

$I_D P_h D$, $I_D < T$ $((T+T_u)P_h+(I_D-T-T_u)P_l+E_t)D$, $I_D-T_u-T_d \geq T$ $((I_D+T)P_h+(I_D-T)P_l+E_t)D$, otherwise For the redundant disks, the energy is:

$I_R P_h R$, $I_R < T$ $(TP_h+(I_R-T)P_l+E_t)R$, $I_R-T_u-T_d \geq T$ $((I_R+T)P_h+(I_R-T)P_l+E_t)R$, otherwise The above analysis of power savings is merely for illustration. The actual energy utilized and conserved will depend on the specific structure and operation of the relevant storage system.

It should be noted that diverted access has some disadvantages. Transitioning disks to low-power mode reduces the number of online spindles at a given time. This has the effect of potentially increasing service times and causing more queuing delays. It can also increase energy consumption if there are many "bad" accesses. A "bad" access is one that forces a disk to be transitioned to high power mode (after caching, if any) after the disk was put in low-power mode before at least one entire break-even time. Typically, workloads with a "bad" mix of reads and writes might cause redundant disks to transition power modes frequently. One mechanism to avoid this is to detect this type of thrashing (via a counter, for example) and disable transitions to low-power mode for a while until the imposed load changes.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents. As but one of many variations, it should be understood that system resource other than disks can be readily transitioned to a low-power mode and utilized in the context of the present invention.

What is claimed is:

1. A method of reducing power consumption in a redundant storage system, comprising:

diverting read requests to a first subset of storage disks in the redundant storage system, so that a second subset of remaining storage disks in the redundant storage system can transition to a lower power mode until the second subset of remaining storage disks is needed to satisfy a write request, wherein all of the storage disks in the redundant storage system are dynamically assigned between the first and second subsets based on redundancy requirements and system load in the redundant storage system;

detecting if the system load in the redundant storage system is high; and if the system load is high, adding one or more storage disks from the second subset of remaining storage disks to the first subset of storage disks in the redundant storage system so as to handle the system load;

detecting if the system load in the redundant storage system is low; and if the system load is low, adding one or more storage disks from the first subset of storage disks to the second subset of remaining storage disks in the redundant storage system.

2. The method of claim 1 further comprising buffering write requests to the second subset of remaining storage disks so as to minimize a number of transitions from the lower power mode to a higher power mode needed to handle the write requests.

3. The method of claim 1 wherein the redundant storage system has (n, m) redundancy and wherein D storage disks are assigned to the first subset of storage disks and wherein D·(n/m) storage disks are assigned to the second subset of storage disks in the redundant storage system.

4. The method of claim 1 wherein each storage disk is a storage resource on a single machine.

5. The method of claim 1 wherein each storage disk is a storage resource in a distributed system.

6. The method of claim 1, further comprising:

in response to a write request, writing data to the second subset of remaining storage disks in the redundant storage system without writing the data to the first subset of storage disks in the redundant storage system.

7. A redundant storage system comprising:

a plurality of storage disks divided into a first subset, wherein all of the plurality of storage disks are dynamically assigned between the first and second subset based on redundancy requirements and system load;

a module which diverts read requests to the first subset of storage disks in the redundant storage system, so that the second subset of storage disks in the redundant storage system can transition to a lower power mode until a second subset of storage disks is needed to satisfy a write request;

a detection module which detects if the system load in the redundant storage system is high and detects if the system load in the redundant storage system is low; and a module which, if the system load is high, adds one or more storage disks from the second subset to the first subset of storage disks in the redundant storage system so as to handle the system load and if the system load is low, adds one or more storage disks from the first subset to the second subset.

8. The redundant storage system of claim 7 further comprising a buffer for buffering write requests to the second subset of remaining storage disks so as to minimize a number of transitions from the lower power mode to a higher power mode needed to handle the write requests.

9. The redundant storage system of claim 7 wherein the redundant storage system has (n, m) redundancy and wherein D storage disks are assigned to the first subset of storage disks and wherein D·(n/m) storage disks are assigned to the second subset of storage disks in the redundant storage system.

10. The redundant storage system of claim 7 wherein each storage disk is a storage resource on a single machine.

11. The redundant storage system of claim 7 wherein each storage disk is a storage resource in a distributed system.

12. A computer-implemented method of reducing power consumption in a redundant storage system, comprising:

diverting read requests to a first subset of storage disks in the redundant storage system, so that a second subset of remaining storage disks in the redundant storage system can transition to a lower power mode until the second subset of remaining storage disks is needed to satisfy a write request, wherein all of the storage disks in the redundant storage system are dynamically assigned between the first and second subsets based on redundancy requirements and system load in the redundant storage system; and buffering write requests to the second subset of remaining storage disks so as to minimize a number of transitions from the lower power mode to a higher power mode needed to handle the write requests.

* * * * *